United States Patent
Tsai et al.

(10) Patent No.: US 12,265,300 B2
(45) Date of Patent: Apr. 1, 2025

(54) BACKLIGHT MODULE

(71) Applicant: DARWIN PRECISIONS CORPORATION, Hsinchu County (TW)

(72) Inventors: Ming Chin Tsai, Hsinchu County (TW); Wen-Tai Shen, Hsinchu County (TW); Chun-Fu Chuang, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/631,089

(22) Filed: Apr. 10, 2024

(65) Prior Publication Data
US 2024/0427193 A1    Dec. 26, 2024

(30) Foreign Application Priority Data
Jun. 21, 2023   (TW) .................. 112123439

(51) Int. Cl.
*G02F 1/13357* (2006.01)
*G02B 6/00* (2006.01)
*G02F 1/1335* (2006.01)

(52) U.S. Cl.
CPC .. *G02F 1/133607* (2021.01); *G02F 1/133603* (2013.01); *G02F 1/133605* (2013.01)

(58) Field of Classification Search
CPC ......... G02F 1/133607; G02F 1/133603; G02F 1/133605
See application file for complete search history.

(56) References Cited

U.S. PATENT DOCUMENTS

| | | | |
|---|---|---|---|
| 11,031,533 B2 | 6/2021 | Chang et al. | |
| 11,906,843 B1* | 2/2024 | Huang | G02F 1/133603 |
| 2009/0296373 A1* | 12/2009 | Chang | G02F 1/133615 |
| | | | 362/97.1 |
| 2020/0379165 A1* | 12/2020 | Hayashi | G02B 6/0091 |
| 2020/0409220 A1* | 12/2020 | Imada | H01L 33/502 |

FOREIGN PATENT DOCUMENTS

| | | |
|---|---|---|
| CN | 102072467 A | 5/2011 |
| CN | 201851960 U | 6/2011 |
| CN | 102762915 A | 10/2012 |
| CN | 214041938 U | 8/2021 |
| TW | 202105776 A | 2/2021 |
| TW | I769917 B | 7/2022 |

* cited by examiner

*Primary Examiner* — Tracie Y Green

(57) ABSTRACT

A backlight module includes a reflective plate, a plurality of light-emitting elements and a plurality of light guide plates. The reflective plate has light source grooves and first position limiting parts, and each light source groove has a reflective surface, a light outlet and a bottom side. The reflective surface is located between the light outlet and the bottom side. The first position limiting parts are respectively connected to the reflective surfaces and are respectively close to the light outlets. The light-emitting elements are respectively disposed in the light source grooves and respectively surrounded by the reflective surfaces. The light guide plates are respectively disposed in the light source grooves and respectively located between the reflective surfaces and the light-emitting elements. The first position limiting parts are respectively adapted to block the light guide plates from being separated from the reflective plate from the light outlets.

11 Claims, 3 Drawing Sheets

BACKLIGHT MODULE

CROSS-REFERENCE TO RELATED APPLICATIONS

This application claims the benefit of Taiwanese Application No. 112123439, filed on Jun. 21, 2023, which is hereby incorporated by reference for all purposes as if fully set forth herein.

FIELD OF THE INVENTION

The present invention relates to a light source module, and in particular to a backlight module.

BACKGROUND OF THE INVENTION

A liquid crystal display device mainly includes a backlight module, a display panel and an outer frame. According to different relative positions between light-emitting elements and a light guide plate, the backlight module can be divided into edge-lit type backlight module and direct type backlight module. Generally speaking, the edge-lit type backlight module has the advantages of thin thickness and low cost; on the other hand, the direct type backlight module can provide better image contrast because of its better effect of local dimming.

However, in the prior art, since the light-emitting angle of the light-emitting elements cannot be effectively controlled, the light with larger light-emitting angle generated by the light-emitting elements located in a bright area is scattered over an adjacent dark area when the backlight module performs local dimming. Therefore, the light affects the display effect of the dark areas, resulting in a decrease in the image contrast. In addition, since the light guide plate is provided for plenty of light to pass through, the volume of the light guide plate is increased and decreased sharply due to the temperature influence. In this way, not only the optical grade of the backlight module is unstable, but also components near the light guide plate are easily squeezed and damaged.

SUMMARY OF THE INVENTION

The present invention provides a light guide plate to improve optical grade, image contrast and durability.

In order to achieve one or all of the above-mentioned purposes or other purposes, the backlight module provided by the present invention includes a reflective plate, a plurality of light-emitting elements and a plurality of light guide plates. The reflective plate has a first surface, a second surface, a plurality of light source grooves and a plurality of first position limiting parts. The first surface is opposite to the second surface. The light source grooves extend from the first surface to the second surface, and the light source grooves respectively have a reflective surface, a light outlet and a bottom side. The light outlet is located on the first surface and is opposite to the bottom side. The reflective surface is located between the light outlet and the bottom side. The first position limiting parts are respectively connected to the reflective surfaces, and are respectively close to the light outlets. The light-emitting elements are respectively disposed in the light source grooves, and are respectively surrounded by the reflective surfaces. The light guide plates are respectively disposed in the light source grooves, and are respectively located between the reflective surfaces and the light-emitting elements. The first position limiting parts are respectively adapted to block the light guide plates from being separated from the reflective plate from the light outlets.

In an embodiment of the present invention, each of the reflective surfaces includes a first side surface and a second side surface, and the first side surface and the second side surface are opposite to each other. Each of the first position limiting parts includes a first position limiting structure and a second position limiting structure. The first position limiting structures are respectively connected to the first side surfaces, and are respectively close to the light outlets. The second position limiting structures are respectively connected to the second side surfaces, and are respectively close to the light outlets.

In an embodiment of the present invention, each of the first position limiting structures and each of the second position limiting structures are respectively interfered with each of the light guide plates.

In an embodiment of the present invention, each of the light guide plates has a second position limiting part. The shapes of the second position limiting parts are respectively complementary to the shapes of the first position limiting structures, and the second position limiting parts are adapted to be respectively combined with the first position limiting structures.

In an embodiment of the present invention, the first position limiting structures respectively protrude from the first side surfaces, and the second position limiting parts are respectively recessed on surfaces of the light guide plates.

In an embodiment of the present invention, the first position limiting structures respectively have a first length protruding from the first side surface, and the second position limiting structures respectively have a second length protruding from the second side surface. Each of the first lengths is larger than each of the second lengths.

In an embodiment of the present invention, the light guide plates respectively have an inner side surface and an outer side surface. The inner side surfaces are respectively opposite to the outer side surfaces, and the inner side surfaces respectively surround the light-emitting elements. The outer side surfaces are respectively abutted against the reflective plate.

In an embodiment of the present invention, the light guide plates respectively have a plurality of light scattering microstructures, and the light scattering microstructures are located on a surface of the light guide plate facing the light outlet and/or a surface of the light guide plate facing the bottom side.

In an embodiment of the present invention, the backlight module further includes a light diffusing plate disposed opposite to the first surface.

In an embodiment of the present invention, the light diffusing plate has a plurality of light shielding areas, and the light shielding areas are overlapped with the light-emitting elements in a normal direction of the first surface.

In an embodiment of the present invention, the backlight module further includes a plurality of light shielding elements. The light-emitting elements respectively have a top and a bottom opposite to the top. The tops respectively face the light outlets, and the bottoms respectively face the bottom sides. The light shielding elements are respectively disposed on the tops.

The backlight module of the present invention adopts a plurality of light guide plates matched with a plurality of light-emitting elements, and the light guide plates and the light-emitting elements are disposed in the light source grooves of the reflective plate. Further, the light-emitting elements are respectively surrounded by the light guide plates in the light source grooves, and the light guide plates are respectively surrounded by the reflective surfaces of the light source grooves, so that the reflective surfaces can reflect light with larger light-emitting angles generated by the light-emitting elements. Therefore, when the backlight module performs local dimming, the light with larger light-emitting angles scattered over an adjacent dark area can be reduced, and the display effect of the dark area is further improved. In addition, the light guide plates of the backlight module of the present invention can be reduced, and the amount of light passing through the light guide plates can be also reduced, so that the ranges of the volume expansion and shrinkage of the light guide plates can be obviously reduced. Therefore, the backlight module of the present invention can provide stable optical grade, and also can prevent components near the light guide plates from being squeezed and damaged. Based on the descriptions above, the backlight module of the present invention can improve the optical grade, the image contrast and the durability.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
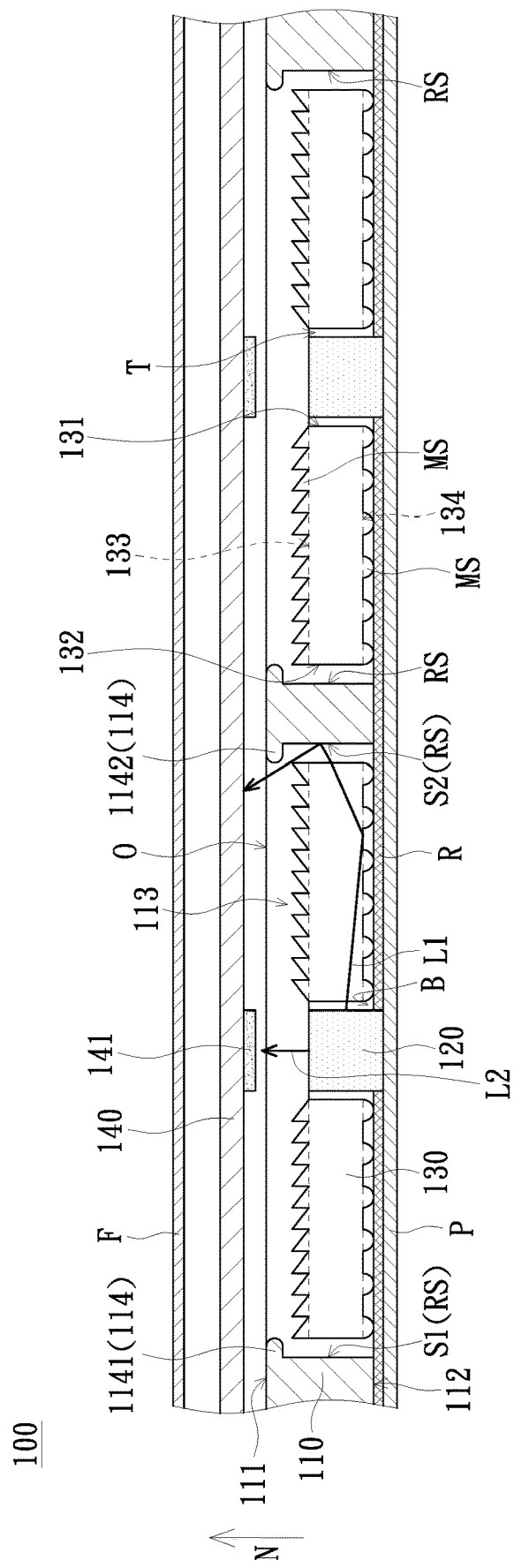
FIG. 1 is a schematic sectional view of a backlight module according to an embodiment of the present invention.
Figure 2:
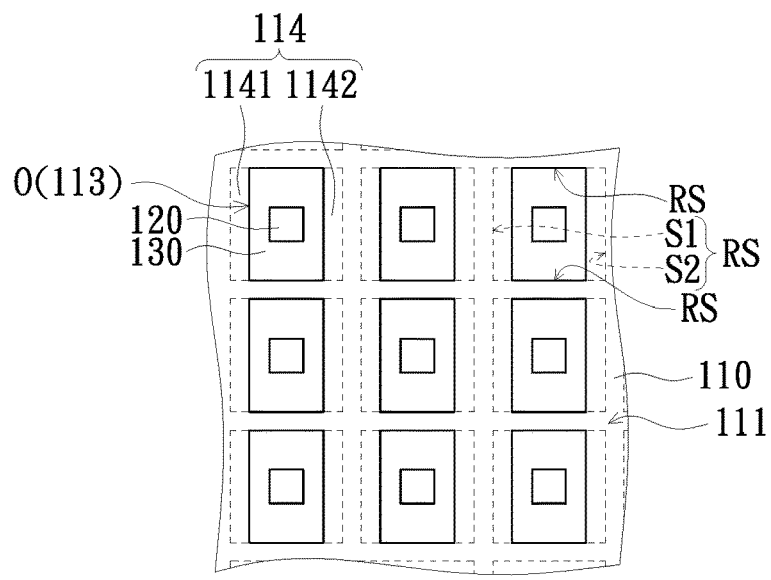
FIG. 2 is a schematic top view of a reflective plate, light-emitting elements and light guide plates of FIG. 1.

FIG. 1 is a schematic sectional view of a backlight module according to an embodiment of the present invention. FIG. 2 is a schematic top view of a reflective plate, light-emitting elements and light guide plates of FIG. 1. With reference to FIGS. 1 and 2, the backlight module 100 includes a reflective plate 110, a plurality of light-emitting elements 120 and a plurality of light guide plates 130. The reflective plate 110 has a first surface 111, a second surface 112, a plurality of light source grooves 113 and a plurality of first position limiting parts 114. The first surface 111 is opposite to the second surface 112. The light source grooves 113 extend from the first surface 111 to the second surface 112, and the light source grooves 113 respectively have a reflective surface RS, a light outlet O and a bottom side B. The light outlet O is located on the first surface 111 and is opposite to the bottom side B. The reflective surface RS is located between the light outlet O and the bottom side B. The first position limiting parts 114 are respectively connected to the reflective surfaces RS, and are respectively close to the light outlets O. The light-emitting elements 120 are respectively disposed in the light source grooves 113, and are respectively surrounded by the reflective surfaces RS. The light guide plates 130 are respectively disposed in the light source grooves 113, and are respectively located between the reflective surfaces RS and the light-emitting elements 120. The first position limiting parts 114 are respectively adapted to block the light guide plates 130 from being separated from the reflective plate 110 from the light outlets O.

The light-emitting element 120 may include a light-emitting diode (LED). In an embodiment, the light-emitting element 120 may be a light-emitting chip that is cut from a wafer and is unpackaged, such as a light-emitting diode chip. For example, the light-emitting diode chip can be a grain-level nitride light-emitting diode chip that emits blue light at a dominant wavelength, but the present invention is not limited to this.

A material of the light guide plate 130 may include polymethyl methacrylate (PMMA); however, in other embodiments, a material of the light guide plate 130 may include cyclo olefin polymer (COP) or polycarbonate (PC). In addition, the light guide plates 130 of this embodiment may be formed by thermoforming or injection molding, but the present invention is not limited to this. With continued reference to FIG. 1, in this embodiment, the light guide plates 130 may respectively have an inner side surface 131 and an outer side surface 132. The inner side surfaces 131 are respectively opposite to the outer side surfaces 132, and the light-emitting elements 120 are respectively surrounded by the inner side surfaces 131. The outer side surfaces 132 are respectively separated from the reflective plate 110; for example, the outer side surfaces 132 of this embodiment are respectively spaced apart from the reflective surfaces RS. In other words, there may be a gap between the light guide plate 130 and the reflective plate 110, so that the light guide plate 130 is more easily placed in the light source groove 113. In an embodiment, the outer side surfaces 132 of the light guide plates 130 may be respectively abutted against the reflective plate 110, for example, respectively abutted against the reflective surfaces RS. In this way, the light leakage problem at edges of the light guide plates 130 can be improved, thereby further improving the optical grade. Incidentally, the light guide plates 130 of this embodiment may have through holes T, and the inner side surfaces 131 are, for example, located in the through holes T. The light-emitting element 120 can be accommodated in the through hole T.

The light guide plates 130 may respectively further have a plurality of light scattering microstructures MS. The light scattering microstructures MS are located on a surface 133 of the light guide plate 130 facing the light outlet O and a surface 134 of the light guide plate 130 facing the bottom side B, so that the light-emitting brightness of the light guide plate 130 is more uniform. For example, the shapes of the light scattering microstructures MS may be annular, and the light-emitting element 120 is surrounded by the light scattering microstructures MS on the surfaces 133 and 134, but the present invention is not limited to this. In other embodiments, the light scattering microstructures MS may be located on the surfaces 133 or 134.

The reflective plate 110 of this embodiment may be formed by curing reflective glue. Further, the reflective plate 110 may be formed by performing injection molding or thermoforming on the reflective glue, and the reflective surface RS is formed together with the reflective plate 110.

In an embodiment, a reflecting layer may be disposed in the light source groove 113 of the reflective plate 110, thereby forming the reflective surface RS. With reference to FIGS. 1 and 2 together again, in this embodiment, the reflective surface RS includes, for example, a first side surface S1 and a second side surface S2, and the first side surface S1 and the second side surface S2 are opposite to each other. The first position limiting part 114 may include a first position limiting structure 1141 and a second position limiting structure 1142. The first position limiting structure 1141 is connected to the first side surface S1, and is close to the light outlet O; the second position limiting structure 1142 is connected to the second side surface S2, and is close to the light outlet O. Therefore, the light guide plates 130 can be blocked from being separated from the reflective plate 110 from the light outlets O by the first position limiting structures 1141 and the second position limiting structures 1142. In detail, the first position limiting structure 1141 protrudes from, for example, the first side surface S1. A part of the light outlet O is covered by the first position limiting structure 1141, and the first position limiting structure 1141 can be overlapped with a part of the light guide plate 130 in a normal direction N of the first surface 111. Similarly, the second position limiting structure 1142 may protrude from the second side surface S2. A part of the light outlet O is covered by the second position limiting structure 1142, and the second position limiting structure 1142 may be overlapped with a part of the light guide plate 130 in the normal direction N. It can be understood that shapes of the first position limiting structure 1141 and the second position limiting structure 1142 are not limited to those shown in FIGS. 1 and 2. In addition, the first position limiting structure 1141 and the second position limiting structure 1142 may be integrated with the reflective plate 110, but the present invention does not limit these details.

In this embodiment, the first position limiting structure 1141 and the second position limiting structure 1142 can be separated from the light guide plate 130, so that the light guide plate 130 can be more easily placed in the light source groove 113. However, in an embodiment, the first position limiting structure 1141 and the second position limiting structure 1142 may be respectively interfered with the light guide plate 130; in other words, the first position limiting structure 1141 and the second position limiting structure 1142 may be respectively abutted against an edge of the light guide plate 130, and the present invention does not limit these details.

An assembly process of the backlight module 100 of this embodiment is as follows. First, a plurality of light-emitting elements 120 are provided, and each of the light-emitting elements 120 may be disposed on a substrate P. Next, the light guide plates 130 are disposed on the substrate P, and the light-emitting elements 120 are respectively surrounded by the light guide plates 130; further, the through holes T of the light guide plates 130 can be used to align with the light-emitting elements 120. After the light guide plates 130 are assembled, the light source grooves 113 of the reflective plate 110 are made to be aligned with the light guide plates 130, and then the reflective plate 110 is disposed on the substrate P. Incidentally, the light source groove 113 penetrates through, for example, the first surface 111 and the second surface 112; in other words, the bottom side B of the light source groove 113 may have an opening in order to be aligned with the light guide plate 130. It can be understood that the assembly process described above is only an example and is not used to limit the present invention.

Compared with the prior art, the backlight module 100 of this embodiment adopts a plurality of light guide plates 130 matched with a plurality of light-emitting elements 120, and the light guide plates 130 and the light-emitting elements 120 are disposed in the light source grooves 113 of the reflective plate 110. Furthermore, the light-emitting elements 120 are surrounded by the light guide plates 130 in the light source grooves 113, and the light guide plates 130 are respectively surrounded by the reflective surfaces RS of the light source grooves 113, so that the light L1 with larger light-emitting angles generated by the light-emitting elements 120 can be reflected by the reflective surfaces RS. Therefore, when the backlight module 100 performs local dimming, the amount of the light L1 scattered over an adjacent dark area can be reduced, thereby improving the display effect of the dark area. In addition, the volumes of the light guide plates 130 of the backlight module 100 of this embodiment can be reduced, and the amount of light passing through the light guide plates 130 can be also reduced, so that the ranges of the volume expansion and shrinkage of the light guide plates 130 can be obviously reduced. Therefore, the backlight module 100 of this embodiment can provide stable optical grade, and can also prevent components near the light guide plates 130 from being squeezed and damaged. Based on the descriptions above, the backlight module 100 of this embodiment can improve an optical grade, an image contrast and durability.

With continued reference to FIG. 1, the backlight module 100 further includes, for example, a light diffusing plate 140. The light diffusing plate 140 is disposed opposite to the first surface 111, so that the light-emitting brightness of the backlight module 100 can be more uniform. In this embodiment, the light diffusing plate 140 may be separated from the first surface 111; for example, the light diffusing plate 140 may be disposed on a glue frame (not shown) of the backlight module 100 to be spaced apart from the first surface 111. However, in one embodiment, the light diffusing plate 140 may be disposed on the first surface 111, and is in contact with the first surface 111. A distance between the light diffusing plate 140 and the first surface 111 may be changed according to the brightness, quantity and other factors of the light-emitting elements 120, so the present invention is not so limited.

It is worth mentioning that the light diffusing plate 140 of this embodiment may have a plurality of light shielding areas 141, and the light shielding areas 141 are overlapped with the light-emitting elements 120 in the normal direction N. In detail, light with smaller light-emitting angles generated by the light-emitting elements 120 can be blocked by the light shielding areas 141, such as light L2 emitted in a forward direction, thereby making the light-emitting brightness of the backlight module 100 be more uniform. In this embodiment, a color of each of the light shielding areas 141 may be darker than other parts of the light diffusing plate 140; further, the light shielding areas 141 may be formed by ink printing, but the present invention is not limited to this.

In this embodiment, the backlight module 100 may further include an optical film F. The optical film F may be disposed opposite to the light diffusing plate 140. For example, the optical film F may be disposed on a side of the light diffusing plate 140 facing away from the reflective plate 110. However, in an embodiment, the optical film F may be disposed between the light diffusing plate 140 and the reflective plate 110. In this embodiment, the number of the optical films F may be one or more, and the optical film F may include a diffusing film, a brightness enhancement film, a prism sheet, an inverse prism sheet and/or a wavelength conversion film, etc., but the present invention is not limited to this.

Incidentally, the backlight module 100 of this embodiment further includes, for example, a reflecting sheet R. The reflecting sheet R may be disposed at the bottom side B of the light source groove 113 to increase a light utilization rate. For example, the reflecting sheet R may be disposed on the substrate P through the opening of the bottom side B. Further, the reflecting sheet R may be disposed on the substrate P first, and then the reflective plate 110 and the light guide plate 130 may be disposed on the reflecting sheet R. A material of the reflecting sheet R may include metal, and the metal includes, for example, silver, but the present invention is not limited to this.

Figure 3:
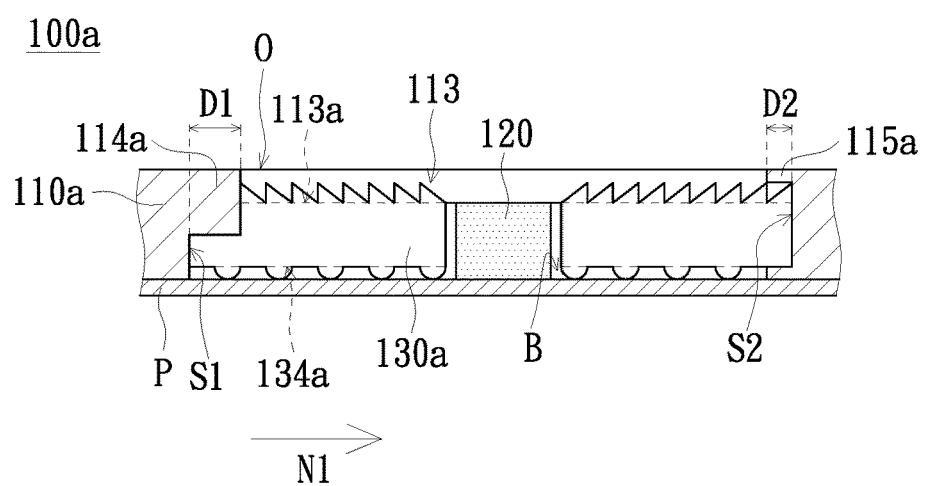
FIG. 3 is a schematic sectional view of a backlight module according to another embodiment of the present invention.
Figure 4:
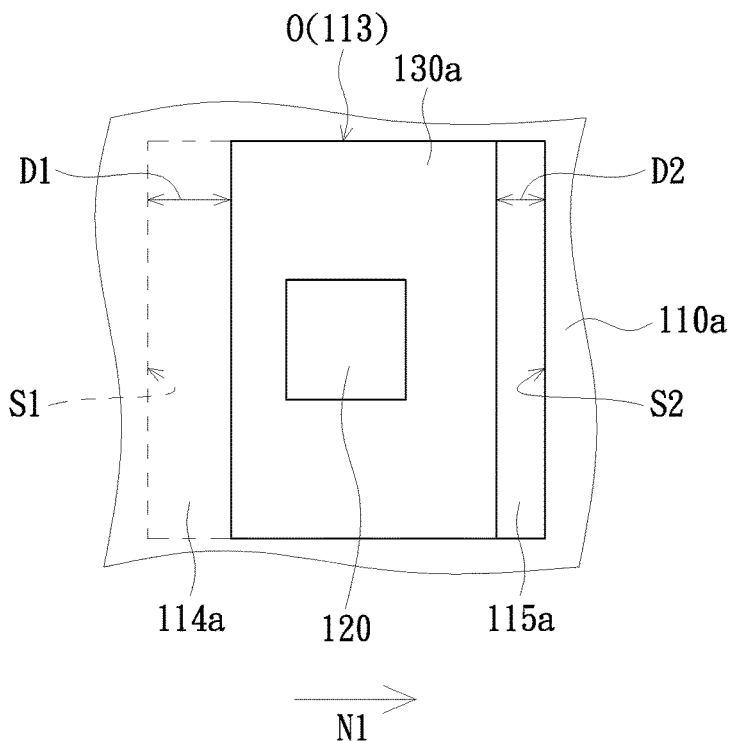
FIG. 4 is a schematic top view of a reflective plate, a light-emitting element and a light guide plate of FIG. 3.
Figure 5:
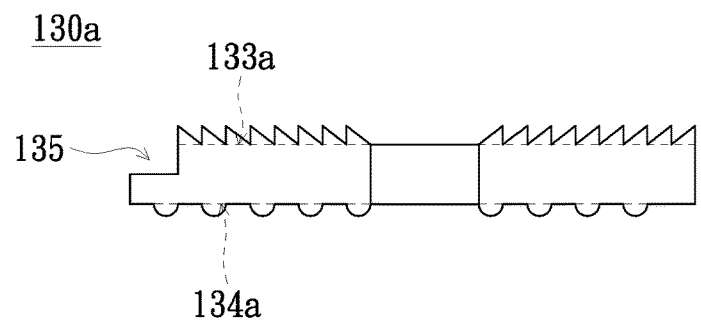
FIG. 5 is a schematic sectional view of the light guide plate of FIG. 3.

FIG. 3 is a schematic sectional view of a backlight module according to another embodiment of the present invention. FIG. 4 is a schematic top view of a reflective plate, a light-emitting element and a light guide plate of FIG. 3. FIG. 5 is a schematic sectional view of the light guide plate of FIG. 3. The structure and advantages of the backlight module 100a of this embodiment are similar to those of the embodiment of FIG. 1, and only the differences will be described below. With reference to FIG. 3, FIG. 4 and FIG. 5 together, each of the light guide plates 130a may have a second position limiting part 135. The shape of the second position limiting part 135 is complementary to that of the first position limiting structure 114a, and the second position limiting part is adapted to be combined with the first position limiting structure 114a. In this way, the light guide plate 130a can be more easily aligned with and disposed in the reflective plate 110a. Specifically, with continued reference to FIGS. 3 and 5, for example, the first position limiting structure 114a protrudes from the first side surface S1, and the second position limiting part 135 is recessed on the surface of the light guide plate 130a. For example, the second position limiting part 135 may be recessed on the surface 133a.

With reference to FIGS. 3 and 4 again, an assembly process of the backlight module 100a of this embodiment is as follows. First, a plurality of light-emitting elements 120 are provided, and each of the light-emitting elements 120 may be disposed on a substrate P. Next, the light guide plate 130a and the reflective plate 110a are disposed on the substrate P, and the second position limiting part 135 of the light guide plate 130a is combined with the first position limiting structure 114a of the reflective plate 110a. In detail, the light guide plate 130a can be fixed in the light source groove 113 by the first position limiting structure 114a of the reflective plate 110a, and the light guide plate 130a can be further fixed in the light source groove 113 by the second position limiting structure 115a, and the light source groove 113 can prevent the light guide plate 130a from falling off the light outlet O. Further, the first position limiting structures 114a may respectively have a first length D1 protruding from the first side surface S1, and the second position limiting parts 115a may respectively have a second length D2 protruding from the second side surface S2. The first length D1 is larger than the second length D2, so that the light guide plate 130a can be more firmly fixed in the light source groove 113. It should be noted that the first length D1 and the second length D2 extend, for example, along a normal direction N1 of the first side surface S1. It can be understood that the assembly process described above is only an example and is not used to limit the present invention.

Figure 6:
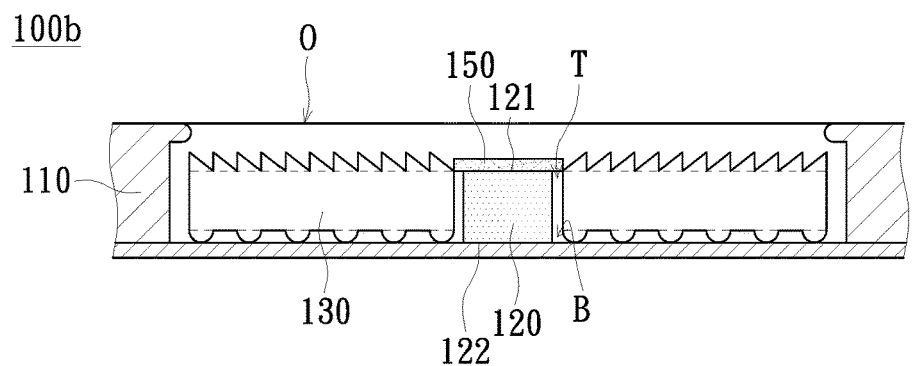
FIG. 6 is a schematic sectional view of a backlight module according to another embodiment of the present invention.

FIG. 6 is a schematic sectional view of a backlight module according to another embodiment of the present invention. The structure and advantages of the backlight module 100b of this embodiment are similar to those of the embodiment of FIG. 1, and only the differences will be described below. With reference to FIG. 6, the backlight module 100b may further include a plurality of light shielding elements 150. The light-emitting elements 120 respectively have a top 121 and a bottom 122 opposite to the top 121. The tops 121 respectively face the light outlets O, and the bottoms 122 respectively face the bottom sides B. The light shielding elements 150 are disposed on the tops 121. In this way, the light with smaller light-emitting angles generated by the light-emitting elements 120 can be blocked by the light shielding elements 150, so that the light-emitting brightness of the backlight module 100b is more uniform. In detail, the light shielding elements 150 are, for example, light shielding covers, and the light shielding elements 150 may cover the tops 121 of the light-emitting elements 120. Furthermore, the light shielding elements 150 may further cover the through holes T of the light guide plates 130, so as to further improve the light leakage problem at the edges of the light guide plates 130, thereby making the light exit brightness of the backlight module 100b be more uniform. In an embodiment, the light shielding element 150 may be a Bragg reflector. In this embodiment, a peak angle of the light-emitting brightness of the light-emitting element 120 may be controlled in a range from about 50 degrees to 90 degrees by the light shielding element 150, but the present invention does not limit the specific range.

To sum up, the backlight module of the present invention adopts a plurality of light guide plates matched with a plurality of light-emitting elements, and the light guide plates and the light-emitting elements are disposed in the light source grooves of the reflective plate. Further, the light-emitting elements are respectively surrounded by the light guide plates in the light source grooves, and the light guide plates are respectively surrounded by the reflective surfaces of the light source grooves, so that the reflective surfaces can reflect light with larger light-emitting angles generated by the light-emitting elements. Therefore, when the backlight module performs local dimming, the light with larger light-emitting angles scattered over an adjacent dark area can be reduced, and the display effect of the dark area is further improved. In addition, the light guide plates of the backlight module of the present invention can be reduced, and the amount of light passing through the light guide plates can be also reduced, so that the ranges of the volume expansion and shrinkage of the light guide plates can be obviously reduced. Therefore, the backlight module of the present invention can provide stable optical grade, and also can prevent components near the light guide plates from being squeezed and damaged. Based on the descriptions above, the backlight module of the present invention can improve the optical grade, the image contrast and the durability.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising:

a reflective plate having a first surface, a second surface, a plurality of light source grooves and a plurality of first position limiting parts, the first surface opposite to the second surface, the light source grooves extending from the first surface towards the second surface, and respectively having a reflective surface, a light outlet and a bottom side, the light outlet located on the first surface and opposite to the bottom side, the reflective surface located between the light outlet and the bottom side, the first position limiting parts respectively connected to the reflective surfaces, and respectively close to the light outlets;

a plurality of light-emitting elements respectively disposed in the light source grooves, and respectively surrounded by the reflective surfaces; and a plurality of light guide plates respectively disposed in the light source grooves, and respectively located between the reflective surfaces and the light-emitting elements, wherein the first position limiting parts are respectively adapted to block the light guide plates from being separated from the reflective plate from the light outlets.

2. The backlight module as claimed in claim 1, wherein each of the reflective surfaces comprises a first side surface and a second side surface, the first side surface and the second side surface are opposite to each other, each of the first position limiting parts comprises a first position limiting structure and a second position limiting structure, the first position limiting structures are respectively connected to the first side surfaces, and are respectively close to the light outlets, and the second position limiting structures are respectively connected to the second side surfaces, and are respectively close to the light outlets.

3. The backlight module as claimed in claim 2, wherein each of the first position limiting structures and each of the second position limiting structures are respectively interfered with each of the light guide plates.

4. The backlight module as claimed in claim 2, wherein each of the light guide plates has a second position limiting part, shapes of the second position limiting parts are complementary to shapes of the first position limiting structures, and the second position limiting parts are adapted to be respectively combined with the first position limiting structures.

5. The backlight module as claimed in claim 4, wherein the first position limiting structures respectively protrude from the first side surfaces, and the second position limiting parts are respectively recessed on surfaces of the light guide plates.

6. The backlight module as claimed in claim 5, wherein the first position limiting structures respectively have a first length protruding from the first side surface, the second position limiting structures respectively have a second length protruding from the second side surface, and each of the first lengths is larger than each of the second lengths.

7. The backlight module as claimed in claim 1, wherein the light guide plates respectively have an inner side surface and an outer side surface, the inner side surfaces are respectively opposite to the outer side surfaces, and the inner side surfaces respectively surround the light-emitting elements, and the outer side surfaces are respectively abutted against the reflective plate.

8. The backlight module as claimed in claim 1, wherein the light guide plates respectively have a plurality of light scattering microstructures, and the light scattering microstructures are located on a surface of the light guide plate facing the light outlet and/or a surface of the light guide plate facing the bottom side.

9. The backlight module as claimed in claim 1, further comprising a light diffusing plate disposed opposite to the first surface.

10. The backlight module as claimed in claim 9, wherein the light diffusing plate has a plurality of light shielding areas, and the light shielding areas are overlapped with the light-emitting elements in a normal direction of the first surface.

11. The backlight module as claimed in claim 1, further comprising a plurality of light shielding elements, wherein the light-emitting elements respectively have a top and a bottom opposite to the top, the tops respectively face the light outlets, and the bottoms respectively face the bottom sides, and the light shielding elements are respectively disposed on the tops.

* * * * *